No. 862,657. PATENTED AUG. 6, 1907.
J. REANEY, Jr.
PROCESS FOR BURNING LIME OR OTHER SUBSTANCES.
APPLICATION FILED MAY 16, 1907.
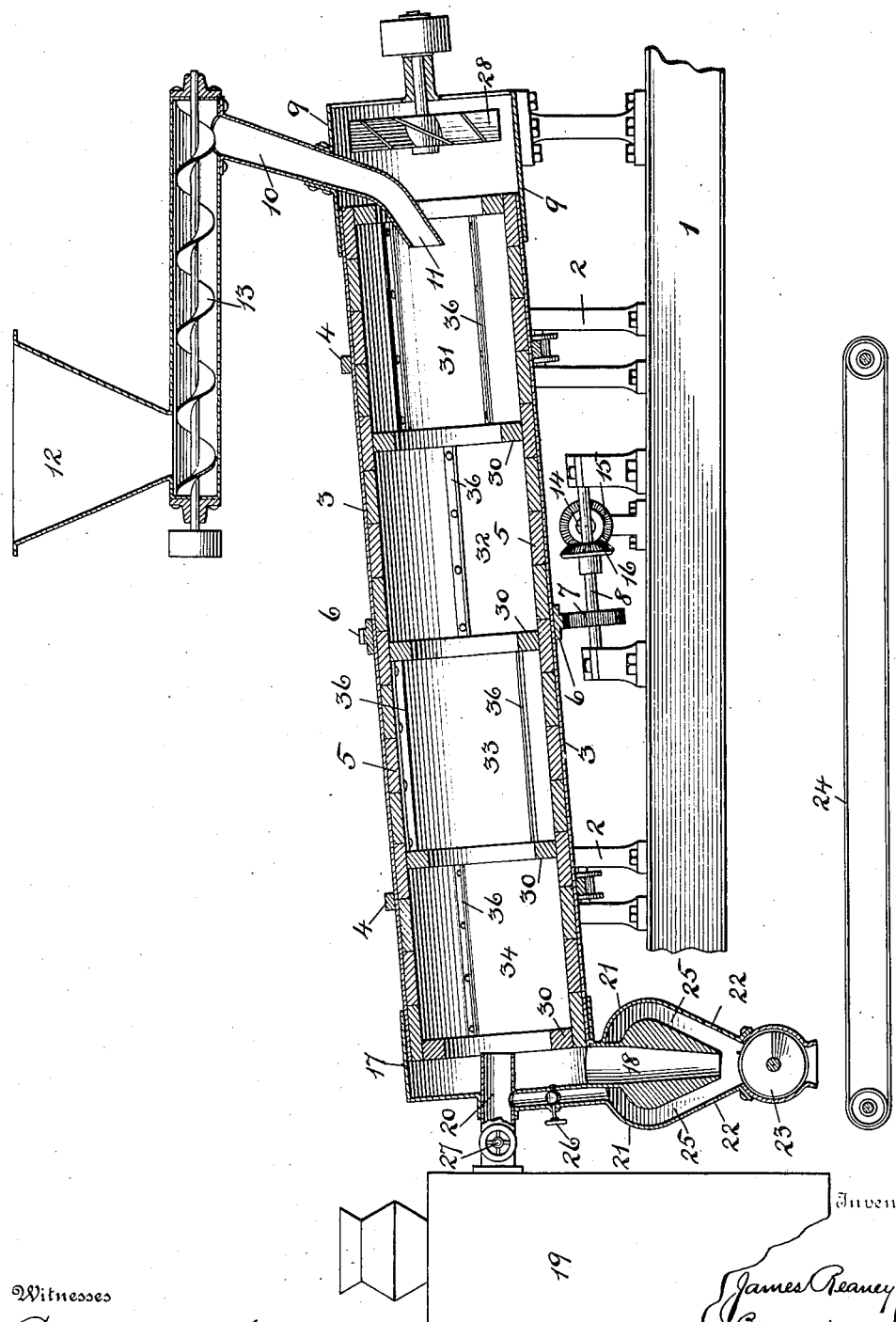
Witnesses
David R. Bryan
Harry Gill
Inventor
James Reaney Jr.
By
Mann & Co,
Attorneys

UNITED STATES PATENT OFFICE.

JAMES REANEY, JR., OF SHERWOOD, MARYLAND.

PROCESS FOR BURNING LIME OR OTHER SUBSTANCES.

No. 862,657.  Specification of Letters Patent.  Patented Aug. 6, 1907.

Application filed May 16, 1907. Serial No. 373,994.

*To all whom it may concern:*

Be it known that I, JAMES REANEY, Jr., a citizen of the United States, residing at Sherwood, in the county of Baltimore and State of Maryland, have invented certain new and useful Improvements in Processes for Burning Lime Rock or other Substances, of which the following is a specification.

This invention relates to an improved method or process for burning lime rock or other substances.

At the present time lime rock or other substances to be burned are placed in a kiln and subjected to heat, and the burning operation is conducted until the particles are deemed to be sufficiently burned. The manner of determining the sufficiency of the burning period varies, according to the kind or style of kiln employed. In the case of a stationary kiln the particles all remain in the heating zone for a given period and are then all removed at the same time. In the case of a rotary kiln the movement of the particles through the kiln is timed, but in all cases all the particles are exposed to the heat for practically the same given period. These methods of burning result in some of the rock material being overburned and some underburned, because all the particles are treated alike in that they are all subjected to the heat for a definite period. If the burning operation is timed so as to insure that all the particles will be burned, then some of the particles will be overburned.

It is a fact that many lime rocks and other materials, differ greatly in their natural formation, both in density and in their chemical composition, even when obtained from the same quarry, and this difference makes it necessary in order to produce a product of uniformity, that the particles should be treated individually, so to speak, instead of collectively, as heretofore.

By my improved method, or process, the particles, although differing greatly in their chemical composition or for other reasons requiring, some, more burning and some less burning, may all be burned to suit their particular requirements, in that as they become sufficiently burned, they are removed from the burning zone, while other particles, which burn more slowly, are retained in the burning zone.

In the burning of lime rock and other materials portions of the component parts are given up in the form of gas, when heat of a proper temperature is applied, the gas or gases passing off with the products of combustion, and the particles change in weight and become lighter as the burning progresses. It is this change in the weight of the particles that I utilize to carry out my process and as the change gradually takes place, I am enabled to produce a product of a uniform character, irrespective of the difference in the character of the material before treatment.

In order that the process may be conducted continuously and automatically, I prefer to employ a rotary kiln, but it is to be understood that the process may be conducted in other ways and by an apparatus differing widely from that shown in the accompanying drawing, forming part of this specification.

The accompanying drawing shows a longitudinal sectional view of one form of apparatus which will be briefly described.

Referring to the drawing by numerals, 1, designates a suitable base or support having suitable roller bearings, 2, at opposite ends which latter sustain a cylinder, 3, in an inclined position,—that is, one end of the cylinder being higher than the other end. This cylinder is provided with exterior metal rings or bands, 4, which travel on the rollers in the bearings, 2. The cylinder may be of any desired construction, having an interior fire-proof lining, 5, and at a point preferably midway between its ends is provided with an exterior circular rack, 6. A pinion, 7, is mounted on a shaft, 8, beneath the cylinder and said pinion meshes with the rack, 6, and causes the cylinder to be revolved. A stationary head, 9, is provided at the higher end of the cylinder and is sustained in any preferred manner, and a chute, 10, extends downwardly through the stationary head with its lower end, 11, terminating in the upper or higher end of the said cylinder. Above the cylinder at any suitable point, I provide a hopper, 12, into which the lime rock or other substance to be burned is placed and at the lower end of said hopper I provide a suitable conveyer, 13, which carries or conveys the rock from the hopper to the upper end of the chute, 10. A main driving shaft, 14, extends beneath the cylinder and carries a bevel pinion, 15, which latter meshes with a bevel gear, 16, on the shaft, 8, so as to revolve the latter. The lower end of the cylinder is also provided with a stationary head, 17, having a vertical passage, 18, through which the products discharged from the cylinder pass. A producer gas apparatus, 19, of any well-known construction, or other heat producing medium, is provided at the lower end of said cylinder and this gas apparatus, in the present instance, is provided with a tube, 20, that projects through said head, 17, and directs the heating agent into the lower end of the inclined cylinder, 3, where it ignites. An air chamber or drum, 21, surrounds the lower end of the discharge passage, 18, and is provided with air admission ports, 22, while a screw conveyer, 23, is located at the lower end of said chamber, or drum, so as to convey the discharged product laterally and deposit it upon a suitable conveyer, 24.

Air passages, 25, are provided around the chamber or drum which latter becomes heated by the product passing through the passage, 18. The heating of this drum serves to heat the air as it travels up through the passages, 25, and before it commingles with the producer gas in tube, 20, after which the combustion takes place. A valve, 26, may be placed in the air passages, 25, to enable the regulation of the quantity of air, while a valve, 27, in the gas tube will govern the quantity of gas or other heating agent. A rotary cooler may be used in place of the above device and the air heated as it passes through at the same time cooling the heated lime, or other material.

At the upper end of the cylinder, I provide a suitable apparatus, 28, such as a rotary fan, which will draw the heat and products of combustion from the lower end of the cylinder out through the upper end thereof. If desired, the products of combustion passing from the upper end of the cylinder may be conveyed to a boiler and utilized in the generation of steam, thus working out economies in the operation of the apparatus.

The interior of the fire-proof cylinder, which in reality is the kiln, is provided with a plurality of inwardly projecting fire-proof rings, 30, or other suitable projections which will serve to dam or check the passage of the lime rock, or other material, in its passage from the higher to the lower end of the cylindrical kiln. The form and number of these projections, rings, or the like, may vary, but in the present instance the kiln is provided with four rings which form successive cylindrical compartments, 31, 32, 33, and 34, the latter being at the lowermost end of the kiln. Each of these rings serve as abutments, or dams, against which the rock, or material under treatment, may be checked in its downward course through the kiln, while the heat acts on it to properly burn it.

The lime rock or material to be burned is first crushed to the proper size and then placed in the hopper, 12, from which it is conveyed by the screw, 13, to the upper end of the chute, 10. The rock, or material, is then conveyed by the chute and discharged into the compartment, 31, in the rotary kiln and behind the partition ring, or dam, 30, where it is tumbled, or agitated, while it begins to heat and drive off any moisture that might be contained in the same. As the burning of the crushed rock, or material, progresses, it parts with its gases, some particles or lumps however being larger than others will require more time before completing this operation, but as the gases pass off, some slowly, and some faster, the particles lose correspondingly in weight, or density. By reason of this change in the weight of the particles, I am enabled to invoke the operation of gravity, to separate the lighter partially burned particles from those that are heavier and less advanced in their burning operation and in order to effect this gravity separation, I provide the partition ring or dam, 30 between the compartments, 31, and 32.

It is a well-known fact that if a quantity of matter consisting of particles which vary in weight is placed in a receptacle and the latter then shaken, the lighter particles will gradually work to the surface. By thus applying this same principle to my method of burning lime rock or other material, I am enabled to separate the lighter burned particles from the heavier unburned particles, and by providing the partitions 30, between the several compartments, the heavier unburned particles at the bottom of the mass are held in check, while the lighter particles on the surface, may pass off, by flowing over the dams. It is therefore to be understood that the particles in the compartment, 32, are lighter than the particles in compartment, 31, and that as the tumbling, agitating, or other motion imparted to the particles in the said compartment, 32, is continued, they will back up behind the rings, or dams, so that again the particles more advanced in their burning operation, and therefore lighter in weight, will rise to the surface and pass off into the compartment, 33.

As the particles advance in their burned condition they also advance from one compartment to another and no matter how ununiform they may be when they enter the kiln, they only advance their position in the kiln as their burning operation progresses. Moreover, as the particles progress in their burning operation, they advance faster and travel more quickly from one compartment to another, and when finally discharged the product is of a uniform character. It will therefore be seen that the period, or length of time, that the particles remain in the kiln varies according to the condition of the particles themselves,—each particle being individually treated according to its requirements and the process of burning being conducted automatically by invoking the law of gravity. Longitudinal projections or flights, 36, are provided in the several compartments and these flights being attached to the rotary kiln or cylinder, travel therewith, and as they pass beneath the mass, they drag out the heaviest unburned particles from the bottom of the mass and carry them upwardly through the hottest part of the compartment and then drop them. These particles drawn from the bottom of the mass in any given compartment, are the heaviest particles in that compartment, and as they are being elevated by the flights so as to be exposed to the direct blast of the heat, most of them will roll back down the curved wall of the cylinder and work beneath the surface of the mass, while others will drop from the flights through the heat and disappear beneath the surface of the lighter particles. This action on the heaviest particles, causes the latter to be properly burned and as they become burned, they break up and get lighter and thus rise to the surface, where they pass off into the next compartment.

As the burned particles discharge from the kiln, they pass down through the passage, 18, and the heat therefrom is utilized to heat the air that is continually passing up through the passages, 25, to mix with the heating agent.

It will be seen that the process may be conducted continuously and automatically.

Having thus described my invention what I claim as new and desire to secure by Letters Patent is,—

1. The process of burning lime rock or other material, consisting in agitating the material in the presence of a burning heat and during the agitation separating by gravity the heavier unburned particles which settle to the bottom from the lighter burned particles which rise to the surface of the mass and removing the lighter separated particles from the surface.

2. The process of burning lime rock or other material, consisting in agitating the material in the presence of a burning heat, holding the material in check during agitation to enable the heavier particles thereof to settle to the bottom of the mass and the lighter particles to rise to the surface, and then removing the lighter particles from the surface of the mass.

3. The process of burning lime rock or other material, consisting in agitating the material in the presence of heat sufficient to burn it, separating by gravity the more advanced burned particles from the less burned particles, and holding in check the less burned particles while permitting the more advanced burned particles to pass off.

4. The process of burning lime rock, or other material, consisting in agitating the particles in the presence of a burning heat, holding the mass in check to permit the unburned particles to settle and the partially burned particles to rise to the surface, then removing the partially burned particles from the surface of the mass and again holding them in check while the burning continues and again permit the less advanced burned particles to settle and the more advanced burned particles to rise to the surface.

5. The process of burning lime rock, or other material, consisting in agitating the particles in the cooler end of a heated receptacle, to gradually heat them and drive off any moisture, holding the mass in check to permit the heavier unburned particles to settle to the bottom and the lighter partially burned particles to advance to a hotter portion of the receptacle, again holding the particles in check to permit the lighter more advanced burned particles to rise to the surface and continuing this intermittent checking and separation of the particles by gravity until the particles are burned.

In testimony whereof I affix my signature in presence of two witnesses.

JAMES REANEY, Jr.

Witnesses:
　HOWARD D. ADAMS,
　ROLAND H. BRADY.